United States Patent [19]

Demirsu

[11] Patent Number: 5,291,272
[45] Date of Patent: Mar. 1, 1994

[54] METHOD AND APPARATUS FOR MEASURING DIMENSIONAL VARIABLES OF THREADED PIPE

[75] Inventor: Errol A. Demirsu, Houston, Tex.

[73] Assignee: Criterion Resources, Inc., Lafayette, La.

[21] Appl. No.: 766,748

[22] Filed: Sep. 27, 1991

[51] Int. Cl.⁵ .................. G01B 11/02; G01B 11/10
[52] U.S. Cl. ............................ 356/384; 356/386
[58] Field of Search .................. 356/384–387, 356/372, 376, 237, 394, 398; 250/560, 561

[56] References Cited

U.S. PATENT DOCUMENTS

| | | | |
|---|---|---|---|
| 3,604,940 | 9/1971 | Matthews | 356/386 |
| 3,765,774 | 10/1973 | Petrohilos | 356/156 |
| 3,905,705 | 9/1975 | Petrohilas | 356/160 |
| 3,922,094 | 11/1975 | Colding et al. | 356/384 |
| 3,924,953 | 12/1975 | Allard | 356/398 |
| 4,007,992 | 2/1977 | Petrohilos et al. | 356/160 |
| 4,315,688 | 2/1982 | Pryor | 356/398 |
| 4,644,394 | 2/1987 | Reeves | 356/398 |
| 4,743,769 | 5/1988 | Schwaiger | 250/560 |
| 4,938,599 | 7/1990 | Goszyk | 356/387 |

FOREIGN PATENT DOCUMENTS

| | | | |
|---|---|---|---|
| 2612630 | 9/1988 | France | 356/384 |
| 0045352 | 4/1977 | Japan | 356/384 |
| 0256208 | 11/1986 | Japan | 356/384 |
| 0258105 | 11/1986 | Japan | 356/384 |

OTHER PUBLICATIONS

"Profile 100 System" Brochure, Brown & Sharpe Mfg. Co.
"Laser Mike® Non Contact Gaging Systems" Brochure; Techmet Company.
"Positioning Tables" Brochure; Trilogy Systems Corp.
"Linear Motors & Controls" Brochure, Trilogy Systems, Corp.

Primary Examiner—Richard A. Rosenberger
Assistant Examiner—Hoa Q. Pham
Attorney, Agent, or Firm—Ben D. Tobor

[57] ABSTRACT

A non-contact method and apparatus for measuring dimensional variables of a threaded exterior surface of a length of pipe utilizes at least one laser generated parallel scanning light beam transmitter and at least one receiver which is disposed on a frame which moves with respect to the longitudinal axis of the pipe, to measure the amount of the scanning beam width which is blocked by the threaded exterior surface at a plurality of sequential locations along the longitudinal axis of the pipe, and the measured amounts are stored as a function of the sequential locations to produce a profile of the threaded exterior surface and to determine from the profile a desired dimensional variable of the threaded exterior surface.

21 Claims, 5 Drawing Sheets

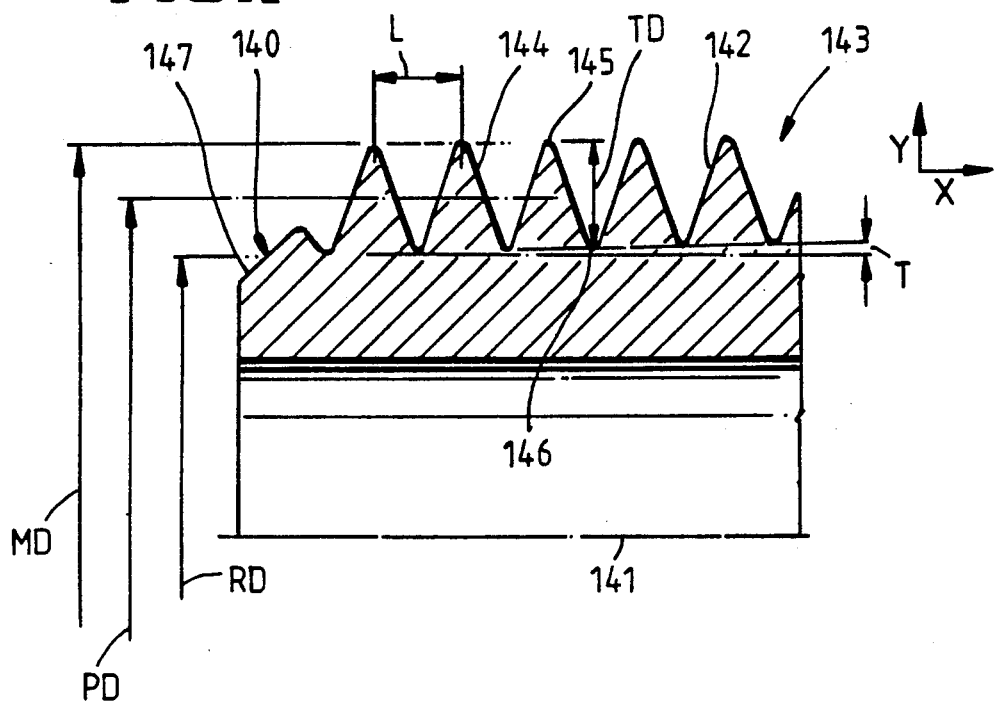
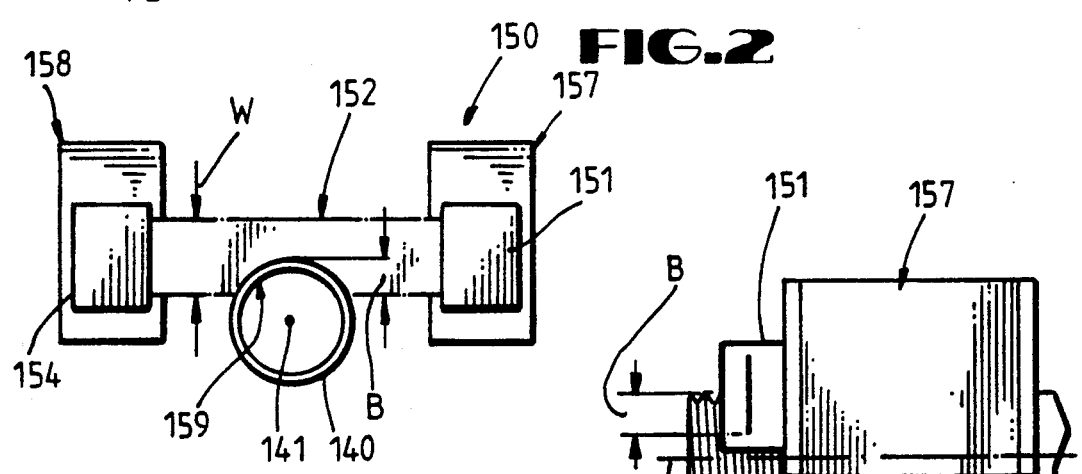
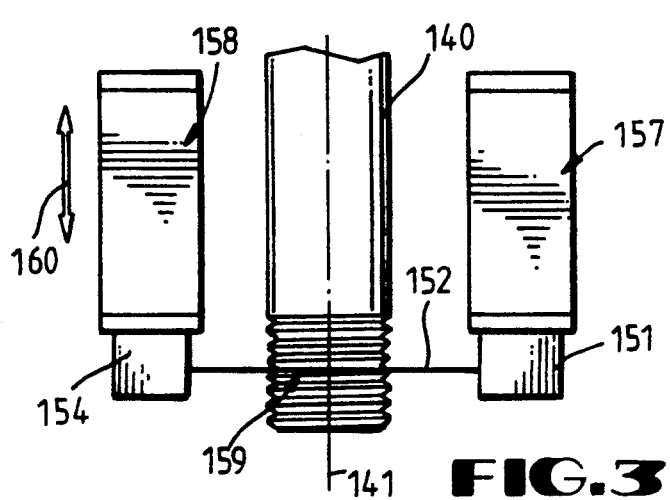

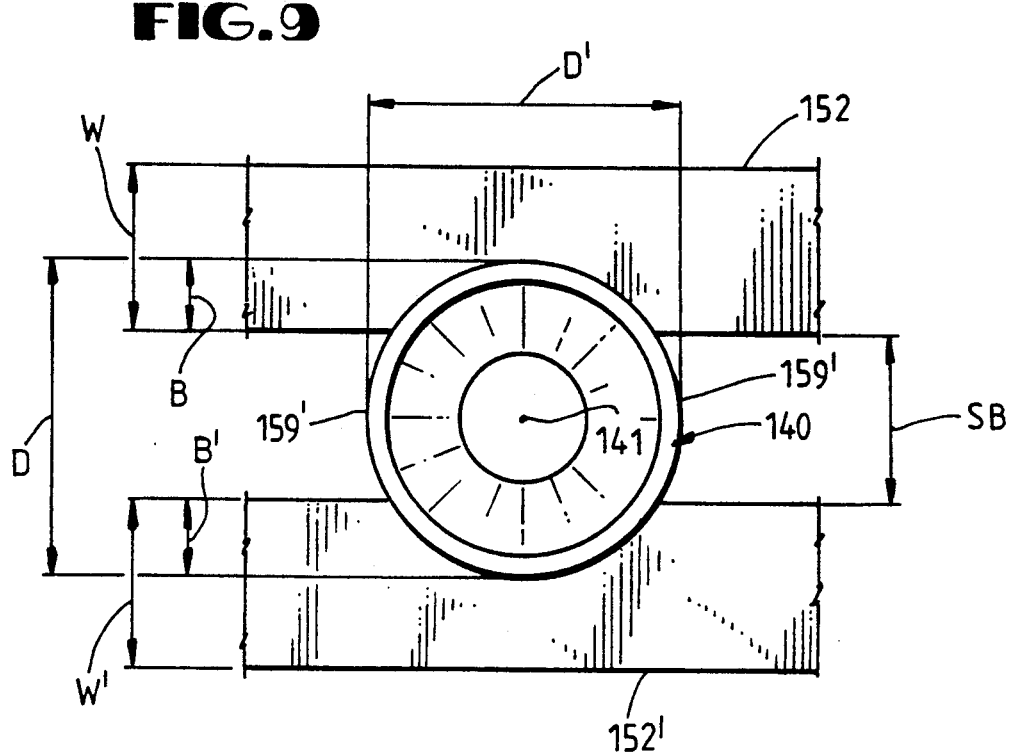
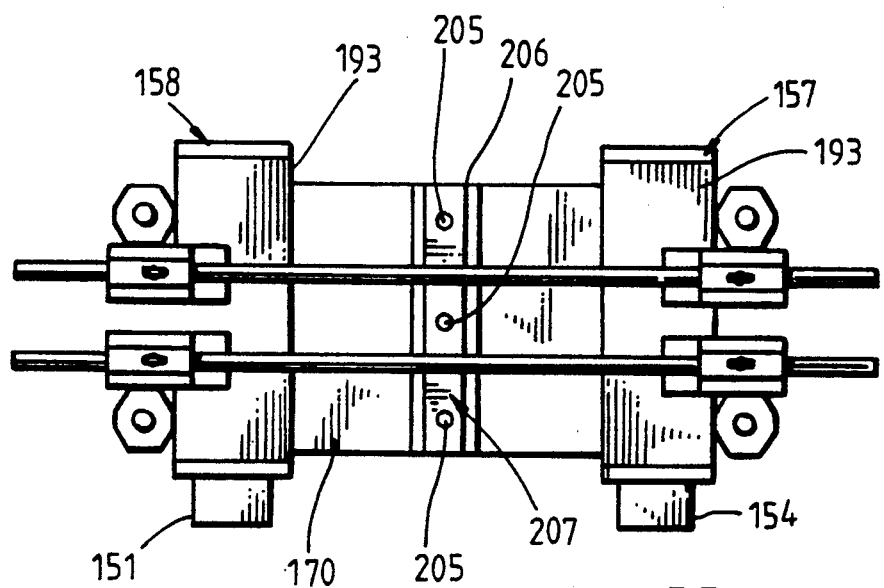

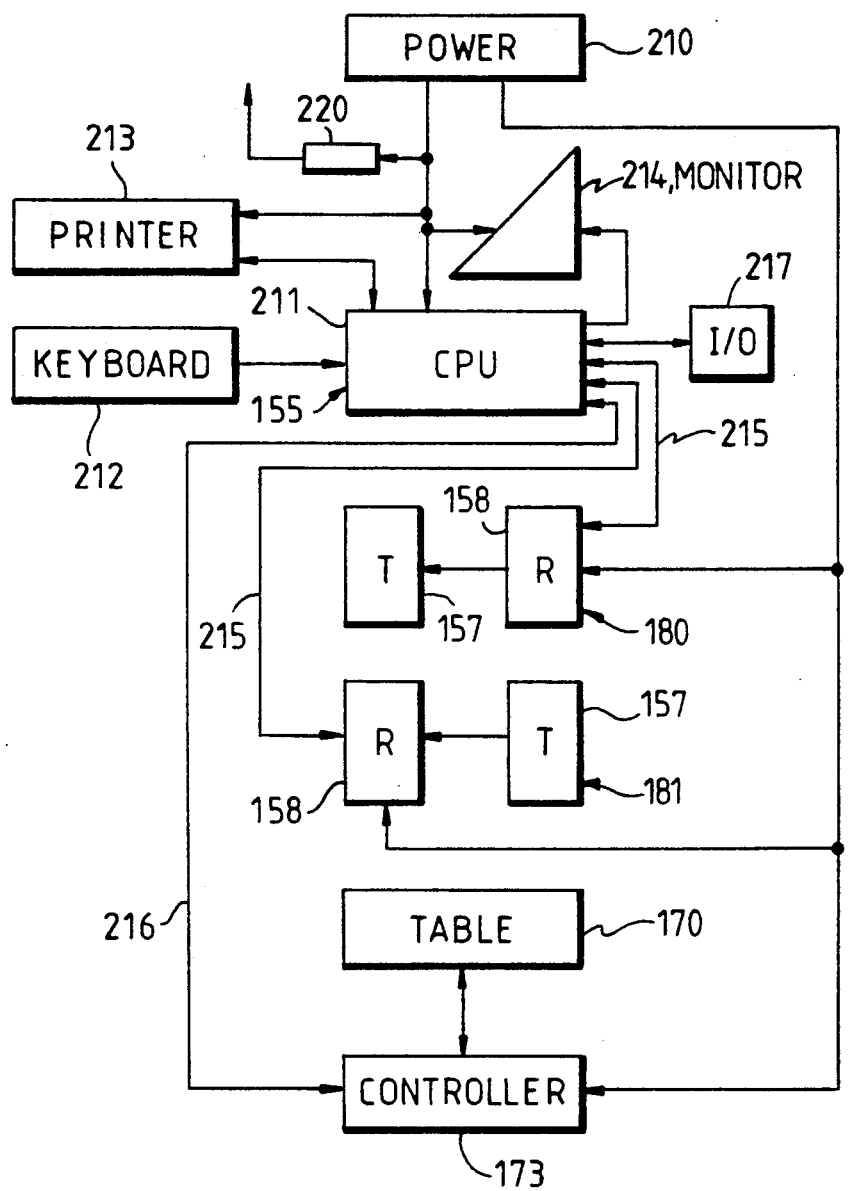

METHOD AND APPARATUS FOR MEASURING DIMENSIONAL VARIABLES OF THREADED PIPE

FIELD OF THE INVENTION

The invention relates to a method and apparatus for measuring dimensional variables of a threaded exterior surface of a length of pipe, particularly large diameter pipe used in oil field operations.

DESCRIPTION OF THE PRIOR ART

In the production of hydrocarbon fluids and gases, it is necessary to drill bore holes through the earth's surface which requires the use of lengths of drill pipe being assembled with threaded joints. Additionally, large diameter sections of pipe, or bore hole casing, are threaded together, the casing serving as a liner within the bore hole which has been drilled. Sections of production tubing are also typically threaded together and placed within the casing. It is extremely important that the threads formed at the end of each of these types of pipes, which can have lengths of ten feet or greater, be manufactured to meet a series of strict values for certain dimensional variables, such as thread depth, pitch, lead, pitch diameter, taper, load flank angle, stab flank angle, thread run out for American Petroleum Institute ("API") buttress thread dimensions, thread width dimensions, API 8 round (rd) and buttress thread dimensions, chamfer angles, L4 8rd API dimensions, Lc dimensions (critical thread length), stab and load flank lengths, crest truncation on line pipe and ovality, so that the threaded connections, or joints, may be easily assembled, or made up, as well as may be readily unthreaded if necessary. Thus, the foregoing types of oil field pipes, generally known as oil country tubular goods, are inspected at the point of manufacture. Additionally, these oil field tubular products are also typically inspected at the storage yards or storage facilities where the products have been transported and are stored prior to being used in well drilling or completion processes, in order to determine whether or not the pipe threads have been damaged in transit, or were not manufactured in accordance to specifications before being shipped. The American Petroleum Institute has defined a series of values and tolerances for the foregoing dimensional variables of API pipe threads on all types and sizes of tubular products used in oil field operations. The values and tolerances for these dimensional variables represent industry standards accepted and used by most drilling firms and oil companies worldwide. Additionally, certain proprietary, non-API thread designs likewise have their own set of values and tolerances for those dimensional variables which also need to be inspected.

At present, most oil field tubular products are inspected by mechanical gauges which contact the pipe thread to determine whether or not the pipe thread meets the required standards and specifications for the particular dimensional variable being measured. Typically, the gauges are manually placed on each threaded surface to be inspected, and the results of the measurement are read from a dial or metered scale associated with the gauge. Typically, a plurality of different gauges must be utilized to measure the various dimensional variables, which can be a time consuming operation when inspecting a plurality of lengths of pipe, as is typically the case.

In addition to being a time consuming operation, there are additional disadvantages associated with conventional, prior art mechanical gauges used to inspect threaded surfaces of oil field tubular products, and measuring various dimensional variables associated with such threaded surfaces. For example, there can be a wide variance in the skills of the person using the various types of mechanical gauges, which can lead to operator associated errors in making the necessary measurements. Additionally, particularly in an outlying storage facility, there can be measurement errors caused by improper calibration of such mechanical gauges, as well as errors associated with wear and tear of the parts of such gauges which engage the threaded surface to be measured. Furthermore, the effects of gravity can affect the accuracy of some of the foregoing measurements. Another type of common operator error is that the person inspecting the threaded surface does not take the desired measurement at the proper location upon the threaded surface, or does not take a sufficient number of measurements to satisfactory determine whether or not the threaded surface conforms with the desired values and tolerances for the dimensional variable being measured. Another deficiency with prior art methods of inspection is that the measured values are typically not required to be recorded; or if they are recorded, it is a time consuming process. Non-recording of the measured values can lead to a lack of accountability as to who may be responsible for a particular threaded connection being defective; e.g. the manufacturer, trucking company which delivered the tubular product, the storage yard, or the drilling company. Under the best of circumstances, conventional, mechanical gauges have an accuracy of about 0.001 inches, or 1 mil. Because of the importance of these measurements and the large sums of money involved in drilling a well and producing hydrocarbon gases or fluids therefrom, it would be desirable to have a higher degree of accuracy, recordability, consistency, and repeatability in measuring these dimensional variables of threaded surfaces.

Accordingly, prior to the development of the present invention, there has been no method and apparatus for measuring dimensional variables of a threaded exterior surface of a length of pipe, which: are not time consuming; are not subject to operator errors; are not subject to errors associated with calibration of the measuring device; are not subject to the effects of gravity; and have a high degree of accuracy, recordability, consistency, and repeatability. Therefore, the art has sought a method and apparatus for measuring dimensional variables of a threaded exterior surface of a length of pipe which: can be easily, quickly, and efficiently utilized; are not subject to operator errors associated with improper use of mechanical gauges; are not subject to calibration errors, particularly errors associated from wear and tear of the components of the mechanical gauges which contact the threaded surfaces; are not affected by gravity; and provide greater accuracy, recordability, consistency, and repeatability in measuring the desired dimensional variable.

SUMMARY OF THE INVENTION

In accordance with the invention the foregoing advantages have been achieved through the present noncontact method for measuring dimensional variables of a threaded exterior surface of a length of pipe having a longitudinal axis. The method of the present invention includes the steps of: directing at least one laser generated parallel scanning light beam, having a known width, in a plane which is substantially perpendicular to the longitudinal axis of the length of pipe, to scan at least one portion of the threaded exterior surface; providing relative sequential movement between the at least one light beam and the threaded exterior surface in a direction along the longitudinal axis of the length of pipe; receiving the at least one light beam at a plurality of sequential locations along the longitudinal axis of the length of pipe to measure the amount of the scanning beam which is blocked by the threaded exterior surface at each sequential location; storing the measured amounts as a function of the sequential locations to produce a profile of the threaded exterior surface; and determining from the profile the desired dimensional variable of the threaded exterior surface.

A feature of the present invention is that the profile of the threaded exterior surface may be compared with a known, desired profile, having acceptable tolerances, for the threaded exterior surface, to determine if the threaded exterior surface, having its dimensional variables being measured, is within the acceptable tolerances of the known, desired profile. A further feature of the present invention is that the length of pipe may be maintained stationary and the step of sequentially moving the at least one light beam along the longitudinal axis of the length of pipe. A feature of the method of the present invention may include the step of determining the dimensional variables of the threaded exterior surface of thread depth, taper, and lead. Another feature of the present invention may include the step of graphically displaying the measured amounts which have been stored.

An additional feature of the present invention may include the steps of: rotating the length of pipe about its longitudinal axis; and scanning an additional portion of the threaded exterior surface to determine a dimensional variable for the additional portion of the threaded exterior surface. Another feature of the present invention may include the step of rotating, three times, the length of pipe ninety degrees about the longitudinal axis of the length of pipe and scanning three additional portions of the threaded exterior surfaces to determine a dimensional variable for the three additional portions of the threaded exterior surface. The dimensional variables determined may be taper, ovality, and pitch diameter.

A further feature of the present invention may include the steps of: utilizing first and second scanning light beams; disposing the first and second light beams in substantially diametrically opposed locations with respect to the length of pipe; and sequentially moving the first and second light beams to scan first and second portions of the threaded exterior surface, the first and second portions of the threaded exterior surfaces being substantially diametrically opposed from each other with respect to the length of pipe.

An additional feature of the present invention may include the steps of: sequentially moving the first light beam in a first direction along the longitudinal axis of the length of pipe to scan the first portion of the threaded exterior surface; and then sequentially moving the second light beam in a second direction along the longitudinal axis of the length of pipe to scan the second portion of the threaded exterior surface, the first direction being opposite from the second direction with respect to the longitudinal axis of the length of pipe.

In accordance with the invention, the foregoing advantages have also been achieved through the present apparatus for measuring dimensional variables of a threaded exterior surface of a length of pipe having a longitudinal axis. The apparatus of the present invention may comprise: at least one means for directing a laser generated parallel scanning light beam, having a known width, in a plane which is substantially perpendicular to the longitudinal axis of the length of pipe to scan at least one portion of the threaded exterior surface; means for providing relative sequential movement between the light beam directing means and the threaded exterior surface in a direction along the longitudinal axis of the length of pipe; at least one means for receiving the at least one light beam at a plurality of sequential locations along the longitudinal axis of the length of pipe to measure the amount of the scanning beam which is blocked by the threaded exterior surface at each sequential location; means for storing the measured amounts as a function of the sequential locations to produce a profile of the threaded exterior surface, and for determining from the profile the desired dimensional variable of the threaded exterior surface; and means for mounting the at least one light beam directing means and at least one receiving means in a spaced relationship with each other, with the portion of the threaded exterior surface of the length of pipe being disposed therebetween.

Another feature of the present invention is that the mounting means may be attached to the means for providing relative sequential movement, whereby the pipe is maintained stationary and the at least one light beam directing means and at least one receiving means are both movable in a direction along the longitudinal axis of the length of pipe. The means for providing relative sequential movement may be a positioning table driven by a linear motor drive.

A further feature of the present invention is that there may be two cooperating pairs of light beam directing means and receiving means associated with the mounting means, disposed in a spaced relationship with each other with their scanning light beams disposed substantially parallel with each other, whereby diametrically opposed exterior threaded surfaces of a length of pipe may be scanned upon movement of the mounting means. An additional feature of the present invention is that the mounting means may include means for releasably adjusting the distance between the light beam directing means and the receiving means of each pair, and the distance between the pairs of light beam directing means and receiving means, to permit different sizes of pipe to be scanned. An additional feature of the present invention is that the means for releasably adjusting may include at least four elongate rod members adjustably disposed in a rectangular configuration, each light beam directing means and receiving means being fixedly secured to a plate member, each plate member being associated with at least one of the elongate rod members, whereby the plate members may be adjustably moved in a horizontal and vertical direction.

The non-contact method and apparatus for measuring dimensional variables of a threaded exterior surface of a length of pipe of the present invention, when compared with previously proposed prior art methods and apparatus have the advantages of: being easily, efficiently, and quickly used; substantially minimizes operator errors; substantially eliminates calibration errors and errors caused by the effects of gravity; and providing substantially increased accuracy, recordability, repeatability, and consistency in determining a particular dimensional variable.

BRIEF DESCRIPTION OF THE DRAWINGS

In the drawings;

FIG. 1 is a partial cross-sectional view, or profile, of a conventional length of pipe having a threaded exterior surface;

FIG. 2 is a front view of an apparatus for measuring dimensional variables of a threaded exterior surface of a length of pipe in accordance with the present invention;

FIG. 3 is a top view of the apparatus of FIG. 2;

FIG. 4 is a side view of the apparatus of FIG. 2;

FIG. 9 is an exploded front view of the length of pipe of FIG. 8;

FIG. 11 is a top view of the apparatus of FIG. 10;

FIG. 13 is a schematic diagram of the system hardware used in the non-contact method for measuring dimensional variables for a threaded exterior surface of a length of pipe in accordance with the present invention.

Figure 7:
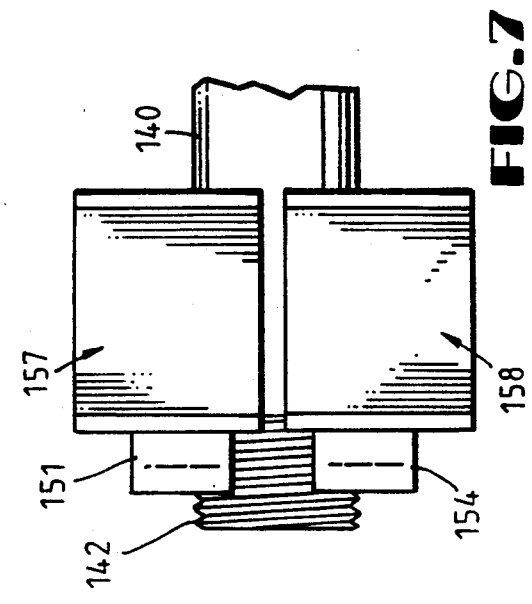
FIG. 7 is a side view of the apparatus of FIG. 5.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In FIGS. 1 and 9, a portion of a length of pipe 140 having a longitudinal axis 141 has a threaded exterior surface 142 formed on at least one end 143 of the length of pipe 140. Pipe 140 may be a conventional threaded oil field tubular product, such as casing; however, it should be understood that the method and apparatus of the present invention, as hereinafter described, may be utilized to measure dimensional variables of a threaded exterior surface, such as threaded exterior surface 142, of any type of threaded, elongate member. Typical, conventional dimensional variables of threaded exterior surface 142 include lead L, thread depth TD, major diameter MD, pitch diameter PD, and taper T, as illustrated in FIG. 1. Lead is the axial distance a thread 144 advances in one revolution of the threaded exterior surface 142. Pitch is the axial distance between corresponding points on adjacent threads 144 and is equal to the reciprocal of the number of threads 144 per inch. In the case of a single thread 144, as illustrated in FIG. 1, the lead L equals the pitch. The thread depth TD is the distance between the crest 145 and root 146 of threads 144. The major diameter MD is the outside, or largest, diameter of the threads 144. The root diameter RD is the smallest diameter of the threads 144 measured between diametrically opposed roots 146. The pitch diameter PD is the mean of the major diameter MD and root diameter RD. The thread taper T is the angle by which the roots 146 taper toward the end 147 of threaded surface 142. An additional typical, conventional dimensional variable of threaded exterior surface 142 is ovality, which is the ratio between two diameters D and D', as illustrated in FIG. 9; the two diameters typically being measured being disposed at a ninety degree angles with respect to each other. Ovality indicates whether or not the threaded surface 142 is out of round, or oval. Other conventional dimensional variables, as previously discussed, which may also be determined in accordance with the method and apparatus of the present invention include: load and stab flank angles; thread width; chamfer angles; L4 and Lc dimensions; and thread run out. As previously described, the foregoing dimensional variables of a threaded exterior surface 142 of a length of pipe 140 have been determined by mechanical gauges (not shown) which have portions which make physical contact with the threaded surface 142 of pipe 140.

With reference now to FIGS. 2–4, the non-contact method for measuring dimensional variables of a threaded exterior surface 142 of a length of pipe 140 and the apparatus 150 for measuring dimensional variables of a threaded exterior surface 142 of pipe 140, in accordance with the present invention, is shown to generally comprise: at least one means for directing 151 a laser generated parallel scanning light beam 152 having a known width W which is substantially perpendicular to the longitudinal axis 141 of the length of pipe 140; means for providing relative sequential movement 153 (FIG. 10) between the light beam directing means 151 and the threaded exterior surface 142 in a direction along the longitudinal axis 141 of the length of pipe 140; at least one means for receiving 154 the at least one light beam 152 at a plurality of sequential locations along the longitudinal axis 141 of the length of pipe 140 to measure the amount B (FIGS. 2 and 4) of the width W of scanning beam 151 which is blocked by the threaded exterior surface 142 at each sequential location; means for storing 155 (FIG. 13) the measured amount B as a function of the sequential locations to produce a profile of the threaded exterior surface 142, such as illustrated in FIG. 1, and for determining from the profile the desired dimensional variable of the threaded exterior surface 142; and means for mounting 156 (FIG. 10) the at least one light beam directing means 151 and the at least one receiving means 154 in a spaced relationship with each other, with the threaded exterior surface 142 of the length of pipe 140 being disposed therebetween.

Still with reference to FIGS. 2 and 4, light beam directing means 151 and receiving means 154 may preferably be conventional optical micrometer equipment which include a laser scanner, or laser light beam transmitter 157 which produces the laser generated parallel scanning light beam 152, and a photodetector receiver 158, both as described in U.S. Pat. Nos. 3,765,774; 3,905,705; and 4,007,992, which patents are incorporated herein by reference, and are assigned to Techmet Company. The laser light beam transmitter 157 and photodetector receiver 158, which may be utilized in practicing the present method and apparatus 150 are manufactured and sold by the LaserMike Division of the Techmet Company of Dayton, Ohio. The parallel scanning light beam 152 generated by transmitter 157 is interrupted by the presence of the portion 159 of threaded surface 142 which is present between transmitter 157 and receiver 158. The interruption of beam 152 is sensed by receiver 158, which measures the amount B of the width W of scanning beam 152 which is blocked by the portion 159 of the threaded exterior surface 142 of pipe 140. As will be hereinafter described in greater detail, the amount B of the width W of light beam 152 which is blocked and sensed by receiver 158 corresponds to a numerical measurement or value along the Y axis of a two dimensional set of coordinates, as illustrated in FIG. 1, as measured at a specific location along the longitudinal axis 141 of pipe 140, which corresponds to a specific value, or coordinate, along the X axis, which is coplanar with the longitudinal axis 141 of pipe 140, as also illustrated in FIG. 1, as will be hereinafter described in greater detail. The Y axis is in a plane which is perpendicular to the longitudinal axis 141 of pipe 140.

By providing relative sequential movement between the light beam directing means 151, or transmitter 157, and the threaded exterior surface 142, and receiving the light beam 152 by receiver means 154, or photodetector receiver 158, a plurality of values of the amount B of width W of light beam 152 may be obtained as a function of the sequential location along the longitudinal axis 141 of pipe 140. The resulting plurality of measured amounts B of the width W of light beam 152 along the Y axis, as a function of the specific sequential location along the longitudinal axis 141 of pipe 140, or X axis, permits the profile of the threaded surface 142, as illustrated in FIG. 1 to be plotted as an analog FIGURE or shape. These X and Y coordinates can then be sampled and processed to determine the particular dimensional variable of the threaded exterior surface 142 of pipe 140 as desired. Additionally, the profile of the threaded surface 142, which has been plotted, may be compared, by storing means 155 (FIG. 13) with a known, desired profile, having acceptable tolerances, for the threaded exterior surface 142, to determine if the threaded exterior surface 142 being measured is within the acceptable tolerances of the known, desired profile. For API threads, the known, desired thread profile is known as a "theoretical perfects", and data corresponding to these "perfects" is available from API and may be stored in storing means 155. For other proprietary thread profiles, if the data corresponding to the desired "perfect" proprietary thread profile is available, it may also be stored and compared with the threaded surface 142 being measured.

When the major diameter MD of pipe 140 exceeds the width W of light beam 152, as illustrated in FIGS. 2-4, whereby only a part of pipe 140 may be scanned and only one transmitter 157 and receiver 158 are utilized, the apparatus 150 of FIGS. 2-4 can produce a thread profile as illustrated in FIG. 1, from which the dimensional variables of lead L, taper T, and thread depth TD can be determined. As will hereinafter be described in greater detail, the other previously described dimensional variables may be determined when utilizing another embodiment of apparatus 150.

Still with reference to FIGS. 2 and 4, the necessary relative sequential movements between threaded exterior surface 142 and the transmitter 157 and receiver 158 may be provided by maintaining transmitter 157 and receiver 158 stationary and moving pipe 140 in a direction along its longitudinal axis 141, as illustrated by arrows 160. Such movement could be provided by supporting pipe 140 on a movable support device (not shown) to provide the desired movement in a direction along its longitudinal axis 141. In the case of pipe 140 being a conventional oil field tubular product, such as casing, it is preferable to maintain pipe 140 stationary and sequentially moving the at least one light beam 152 in a direction along the longitudinal axis 141 of the length of pipe 140 in the direction of arrows 160, as by moving transmitter 157 and receiver 158 simultaneously in a direction along the longitudinal axis 141 of pipe 140.

Figure 10:
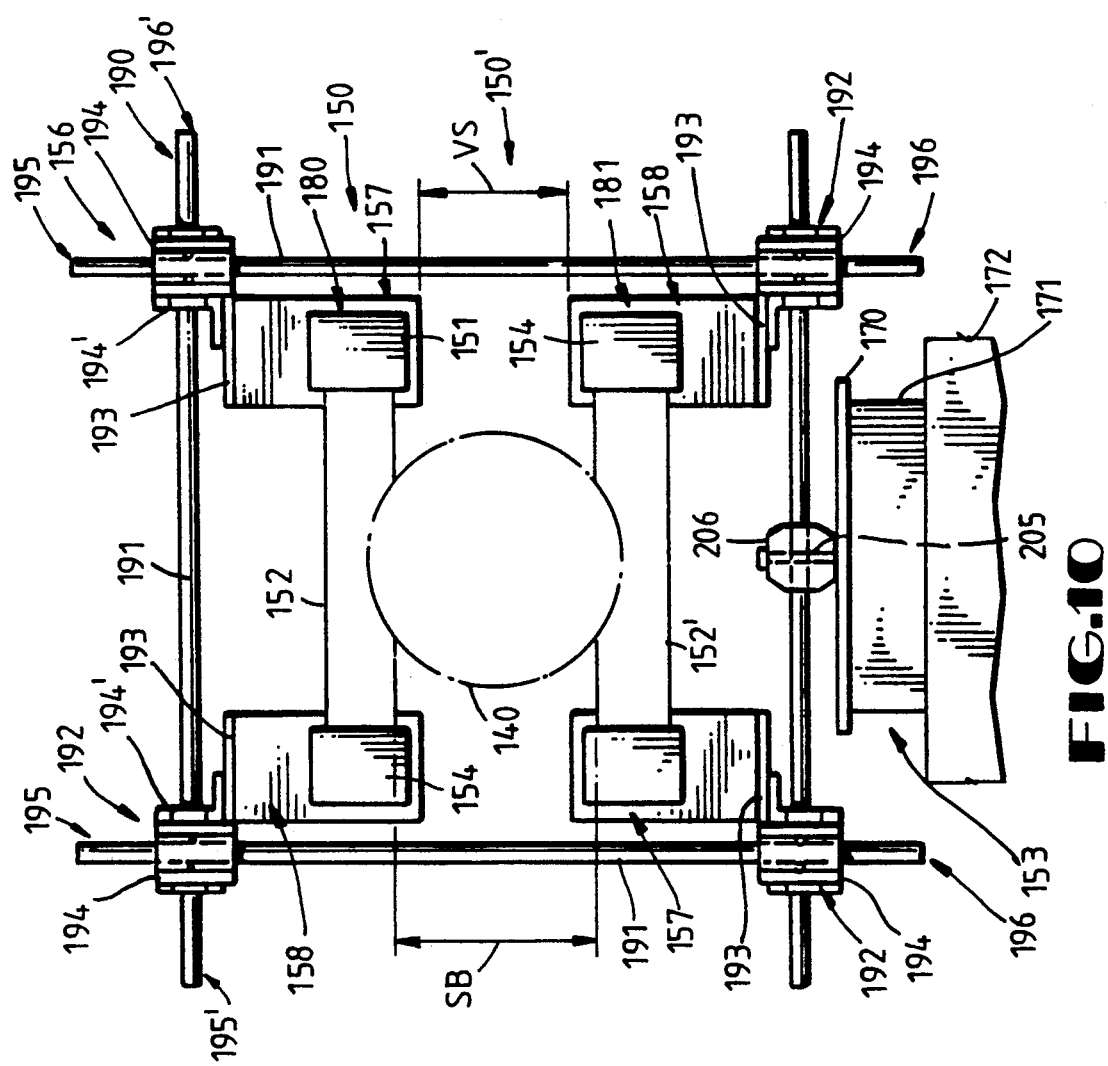
FIG. 10 is a front view of the apparatus of FIG. 5 disposed in a mounting framework.

Preferably, the means for providing relative sequential movement 153 is a positioning table 170 driven by a linear motor drive 171, as illustrated in FIGS. 10 and 11. For drawing clarity, table 170 and linear motor drive 171 are not illustrated in FIG. 12. Table 170 and linear motor drive 171 are mounted on any suitable supporting structure 172 which may be a table, dolly, or any other rigid supporting structure which provides a stable base for linear motor drive 171 and positioning table 170. A suitable positioning table 170 driven by a linear motor drive 171 is manufactured by Trilogy Systems Corp. of Webster, Tex., such positioning table 170 being designed for precise positioning and movement while being driven by linear motor drive 171. Positioning table 170 may be moved along a direction corresponding to the longitudinal axis of pipe 140 at a constant velocity, in precise pre-determined, discrete steps, or increments, at a rate of from one to several hundred steps per second. The precise linear movement of motor drive 171 is controlled by a conventional motion controller 173 (FIG. 13) which controls linear motor drive 171, and in turn the movement of positioning table 170. Under normal operating conditions, a single step of the linear motor is defined as a distance of 0.0001968 inches or 5 microns. In utilizing the apparatus 150 of the present invention and practicing the method of the present invention, the linear motor drive 171 will move positioning table 170 at a rate of from 1,000 to 5,000 steps per second for a period of from ten to sixty seconds, with 20 to 100 steps corresponding to a sequential location along the longitudinal axis 141 of pipe 140, or X axis, as illustrated in FIG. 1. At each such sequential location, or 20 or 100 steps, the amount B of the width W of scanning beam 152 is measured, as previously described.

Figure 5:
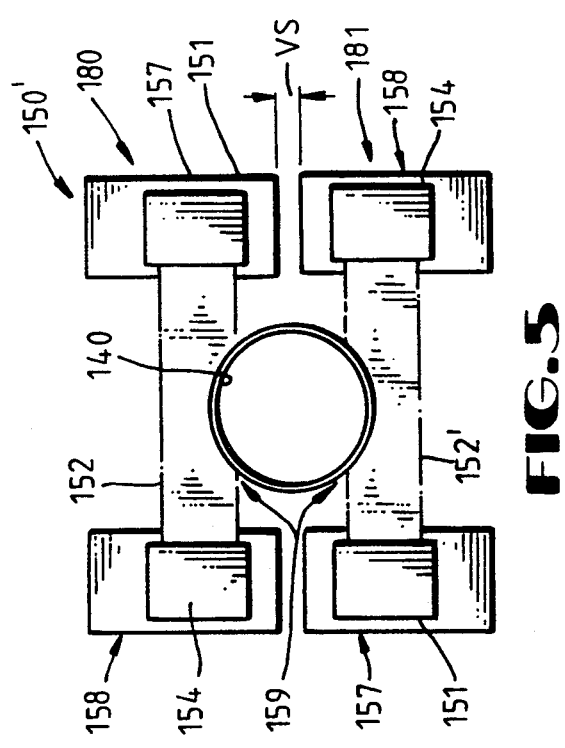
FIG. 5 is a front view of another embodiment of an apparatus for measuring dimensional variables of a threaded exterior surface of a length of pipe in accordance with the present invention.
Figure 6:
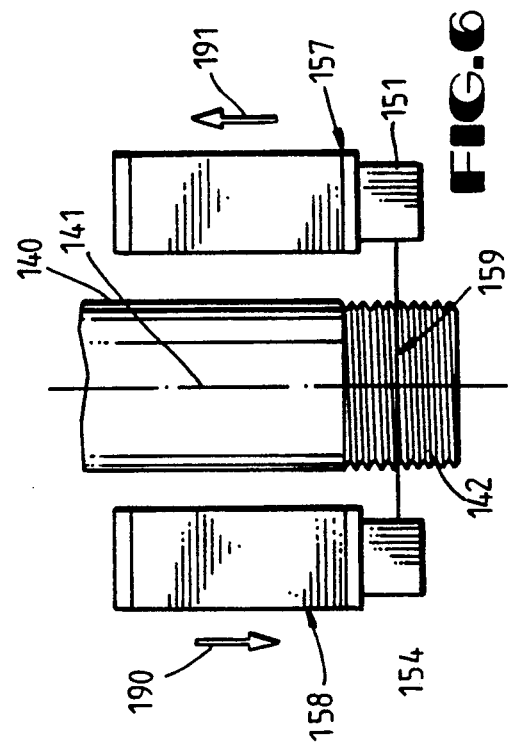
FIG. 6 is a top view of the apparatus of FIG. 5.

Turning now to FIGS. 5-9, another embodiment of apparatus 150' utilizes two cooperating pairs 180, 181 of light beam directing and receiver means 151, 154; each light beam directing means 151, or laser light beam transmitter 157, producing a laser generated parallel scanning light beam 152, 152', each beam 152, 152' scanning a different portion 159 of the threaded exterior surface 142 of pipe 140. The pairs 180, 181 of cooperating transmitters 157 and receivers 158 are disposed in a spaced relationship with each other with their scanning light beams 152, 152' disposed substantially parallel with each other, whereby diametrically opposed exterior threaded surfaces 142, or diametrically opposed portions 159 may be scanned by light beams 152, 152'. The pairs 180, 181 of transmitters 157 and receiver 158 are spaced in a fixed relationship a known vertical spacing distance VS, apart upon mounting means 156, as will be hereinafter described in greater detail. Each of the transmitters 157 and receivers 158 are of the same construction and operate in the same manner, as previously described, in connection with the apparatus 150 of FIGS. 2-4. As illustrated in FIG. 5, the transmitter 157 of pair 180 is disposed above the receiver 154 of pair 181; however, if desired, the transmitter 157 of each pair 180, 181 may be disposed above each other. Alternatively, another transmitter 157 and receiver 158 pair may be utilized, the three pairs (not shown) being disposed in the configuration of an equilateral triangle, whereby three portions of the threaded surface 142 may be scanned. Likewise, four transmitter/receiver pairs could be utilized in a square configuration.

Figure 8:
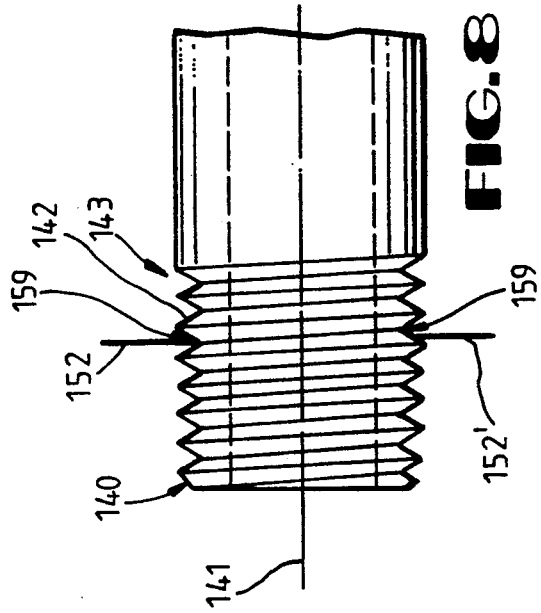
FIG. 8 is a side view of a portion of a length of pipe having a threaded exterior surface having dimensional variables determined by the apparatus of FIG. 5.

As seen in FIG. 9, the scanning beam 152 produced by transmitter 157 of pair 180 is received by receiver 158 to measure the amount B of the width W of scanning beam 152 which is blocked by the upper portion 159 of threaded exterior surface 142. Receiver 158 of the lower pair 181 receives scanning beam 152' of transmitter 157 of the lower pair 181 and measures the amount B' of the width W' of scanning beam 152 which is blocked by the portion 159 of threaded exterior surface 142. Because the spacing VS between the pairs 180, 181 is fixed and known, the distance SB between scanning beams 152 and 152' can be calibrated and fixed. By combining the respective measurements of the amounts B and B' as a function of the location along the longitudinal axis 141 of pipe 140 whereat each measurement is taken, and knowing the fixed spacing distance SB between scanning beams 152, 152', a complete thread profile, as illustrated in FIG. 8, may be plotted as previously described. In addition to being able to determine the dimensional variables of lead L and thread depth TD, the previously described dimensional variables of major diameter MD, pitch diameter PD, root diameter RD, and taper T may be determined, as well as all of the previously described dimensional variables. For drawing clarity, the major diameter MD, pitch diameter PD, root diameter RD are illustrated collectively as diameter D in FIG. 9. After determining those dimensional variables D, in FIG. 9, pipe 140 may be rotated ninety degrees about its longitudinal axis 141, so that threaded surface 142 of pipe 140 may have scanned two additional portions 159' of threaded exterior surface 142 of pipe 140, which are diametrically opposed from each other. The same measurements of the amounts B and B' can then be plotted as a function of the specific location along the longitudinal axis 141 of pipe 140 to determine the major diameter MD, pitch diameter PD, and root diameter RD, collectively illustrated at D' in FIG. 9. After having determined those various diameters D and D', their ratio can be determined to determine the dimensional variable of ovality, as previously discussed. If desired, for greater accuracy and reliability, it is preferred that pipe 140 be rotated about its longitudinal axis a plurality of times in increments of five, ten, or fifteen degrees, or whatever increments are desired. Preferably, pipe 140 is rotated in ten degree increments.

In connection with the apparatus 150' of FIGS. 5-9, it is preferred that relative sequential movement between transmitter 157 of pair 180 be first provided in the manner previously described by positioning table 170 and linear motor 171. Transmitter 157 is moved simultaneously with its cooperating receiver 158 of pair 180 in a direction along either arrow 190 or 191 along the longitudinal axis 141 of pipe 140, during which time the other pair 181 of transmitter 157 and receiver 158 is inoperative. After pair 180 has taken its measurements along the length of portion 159 of threaded surface 142 of pipe 140, the lower pair 181 of transmitter 157 and receiver 158 is moved along the longitudinal axis 141 of pipe 140 in a direction opposite that previously taken by pair 180. For example, if pair 180 moves with respect to pipe 140 in the direction of arrow 190 (FIG. 6), pair 181 of transmitter 157 and receiver 158 would be operative while moving in the direction of arrow 191 (FIG. 6) to make the desired measurements B'. Alternatively, both pairs 180, 181 may be moved simultaneously along the longitudinal axis of pipe 140, and both pairs 180, 181 are simultaneously operated to make the desired measurements B and B'.

It should be noted that with respect to the apparatus 150 of FIGS. 2-4, pipe 140 may be rotated any number of times, but preferably at least three times, each time the pipe 140 being rotated ninety degrees about its longitudinal axis 141, whereby additional amounts B may be obtained for each of the additional portions 159 of threaded surface 142 of pipe 140 which are scanned by transmitter 157. Such additional measurements can provide a better statistical model of the thread profile of FIG. 1 and thus provide a better analysis of whether or not the desired dimensional variables of lead L and thread depth TD, are being maintained. Alternatively, as previously described, pipe 140 may be rotated about its longitudinal axis in other incremental amounts such as five, ten, fifteen or twenty degree increments, or whatever incremental amounts are desired, to obtain a greater number of portions 159 of threaded surfaces 142 to be scanned, to thus increase the accuracy and reliability of the measurements.

Figure 12:
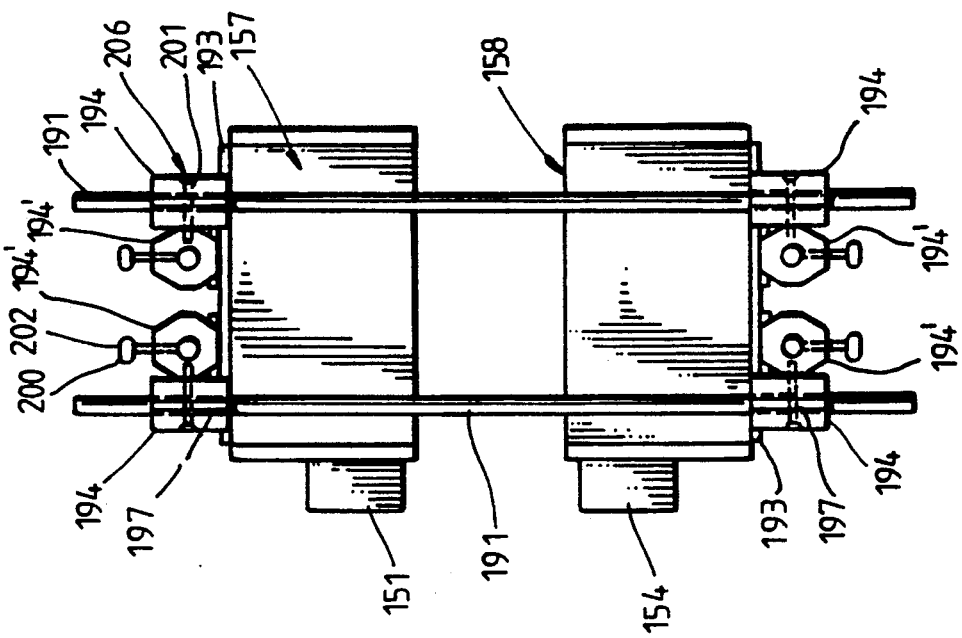
FIG. 12 is a side view of the apparatus of FIG. 10.

With reference to FIGS. 10-12, mounting means 156 for apparatus 150 and 150' include a framework 190 which mounts cooperating transmitters 157 and receivers 158 in the desired space relationship with respect to each other. In the case of the apparatus 150' of FIGS. 5-9, framework 190 maintains the desired vertical spacing VS between pairs 180, 181 of transmitters 157 and receivers 158. The framework 190 of mounting means 156 preferably includes at least four elongate rod members, each rod member 191 being disposed in a perpendicular relationship with adjacent rod members 191 as shown in FIG. 10. Preferably, there are four pairs of elongate rod members 191, the elongate rod members 191 of each pair being disposed parallel to one another, and the pairs of elongate rod members 191 being disposed substantially perpendicular to adjacent pairs of elongate rod members 191. Preferably, the framework 190 of mounting means 156 includes means for releasably adjusting 192 the distance between light beam directing means 151 and receiving means 154, or distance between transmitters 157 and receivers 158, and for adjusting the distance VS between the pairs 180, 181 of transmitters and receivers 157, 158, to permit different sizes of pipe 140 to be scanned.

Elongate rod members 191, and the other components of framework 190, can be made of any suitable material having the requisite strength and rigidity requirements to provide a strong, rigid framework, such as steel or aluminum. Rod members 191 can also have any desired cross-sectional configuration, although a circular configuration is preferred.

As seen in FIGS. 10-12, each transmitter 157 and receiver 158 may be fixedly secured, as by bolting, to a plate member 193, each plate member 193 being associated with at least one of the elongate rod members 191, whereby the plate members 193, and transmitters or receivers 157, 158 secured thereto, may be adjustably moved in a horizontal and vertical direction. Preferably, each vertically disposed elongate rod member 191 has a mounting block 194 disposed at each upper and lower end 195, 196 of each vertically disposed elongate rod member 191. Mounting blocks 194 may have any suitable cross-sectional configuration, but must have a passageway 197 extending therethrough with a cross-sectional configuration closely conforming to the outer cross-sectional configuration of elongate rod members 191. Likewise, the horizontally disposed elongate rod members 191 are provided with mounting blocks 194' at both ends 195', 196' of horizontally disposed elongate members 191, mounting blocks 194' having the same configuration as mounting blocks 194. Each mounting block 194, 194' includes locking means 200 for fixedly securing each mounting block 194, 194' to its respective elongate rod member 191. For example, mounting blocks 194 may include locking screws 201 which may be threaded and screwed into engagement with the elongate rod member 191 passing therethrough. Alternatively, locking means 200 could comprise a locking wing nut 202 which is threadedly received within mounting block 194' to engage the elongate rod member 191 passing therethrough.

The pairs of mounting blocks 194, 194' disposed at a corner of framework 190 are fixedly secured to a plate member 193 which is also disposed at a corner of framework 190. Alternatively, a pair of mounting blocks 194' may be fixedly secured to its corresponding plate member 193, and the mounting blocks 194' may be fixedly secured to an adjacent mounting block 194, as see in FIG. 12. Thus, plate members 193 may be moved in a vertical direction, by loosening locking screws 201 of mounting blocks 194, whereby plate members 193 can be moved upwardly or downwardly along the vertically disposed elongate rod members 191, via the sliding relationship between mounting blocks 194 and vertically disposed elongate rod members 191. When the desired vertical spacing VS between pairs 180, 181 of transmitters 157 and receivers 158 is obtained, locking means 200 on mounting blocks 194' or locking wing nuts 202, may be loosened, whereby the plate members 193 may be moved in a horizontal direction, via the sliding relationship between mounting blocks 194' and the horizontally disposed elongate rods 191, until the desired spacing between cooperating transmitters and receivers 157, 158 is obtained to permit pipe 140 to be disposed therebetween, as illustrated in FIGS. 9 and 10. After the desired horizontal spacing between transmitters and receivers 157, 158 is achieved, locking wing nuts 202 are fixedly secured with respect to the horizontally extending elongate rod members 191.

With reference to FIGS. 10 and 11, it is seen that framework 190 of mounting means 156 is preferably fixedly secured to positioning table 170 as by a plurality of bolts 205 which pass through at least one reinforcing member 206 and into positioning table 170. Preferably, reinforcing member 206 is a rigid, elongate member, having passageways 207 extending therethrough, whose cross-sectional configuration closely conforms to the cross-sectional configuration of the lower horizontally disposed elongate rod members 191 which pass through passageways 207. Any suitable locking means (not shown) fixedly secures reinforcing member 206 to the rod members 191 passing therethrough. It is thus seen that mounting means 195 provides a rigid and adjustable framework 190 for mounting the transmitters and receivers 157, 158, so as to allow for different sizes of pipe to be inspected with apparatus 150 or 150'. If it is desired to utilize a single pair 180, or 181 of transmitters and receivers 157, 158, as illustrated in FIGS. 2–3, it is only necessary to remove the undesired pair, 180, or 181 from the framework 190.

With reference to FIG. 13, a control system and computer hardware for apparatus 150, 150' is shown to include: a portable power supply 210 which provides power for the various components of the system, including the pairs 180, 181 of transmitters 157 and receivers 158; positioning table 170 and its controller 173; and the means for storing and determining the desired dimensional variable 155. Preferably, the means for storing and for determining 155 the desired dimensional variable is a conventional MS-DOS based personal computer, or central processing unit, 211 which may have associated therewith, in a conventional manner, a computer keyboard 212, printer 213, and graphic monitor 214, all of which also receive their power from portable power supply 210. Storing and determining means 155 may also be operated to perform the thread profile comparison step previously described. The power is supplied from power source 210 in a conventional manner by suitable, conventional wiring. Each of the pairs of 180, 181 of transmitters and receivers 157, 158 are provided with standard RS-232C type serial computer connections 215 which allow data, comprised of the measurements of the amounts of the scanning beam width which is blocked by the threaded exterior surface at each sequential location along the length of the threaded surface of the pipe, to be read as well as to permit control commands or instructions to be sent to the pairs 180, 181 of transmitters 157 and receivers 158. The foregoing measured amounts corresponding to the Y axis coordinate, as previously described, is monitored continuously by the computer 211 in real time. The controller 173 for the linear motor drive 171 which moves positioning table 170 is also provided with a conventional RS-232C type serial computer connection 216 which permits data corresponding to the sequential location of the positioning table 170, and in turn location of the pairs 180, 181 of transmitters and receivers 157, 158 along the X axis, as previously discussed, to be read by the computer 211. Connection 216 also sends control commands and instructions to motion controller 173. By a conventional command from keyboard 212 to computer 211, an equipment operator can initiate movement of positioning table 170, by instructing the computer 211 to activate the linear motor drive 171 which drives positioning table 170 and is controlled by motion controller 173. As soon as the linear motor drive 171 is activated by computer 211, the means for storing and for determining the desired dimensional variable 155, or computer 211, begins to collect and store the measured amounts B of the scanning beam width W which is blocked by the threaded exterior surface at each sequential location, as previously discussed, which is recorded as a function of the specific sequential location along the longitudinal axis of the pipe, or the X axis. The process continues until the entire length of the threaded exterior surface of the pipe has been scanned, as previously described. Suitable input/output programming routines 217 are stored within computer 211 which operate upon the stored X and Y coordinates corresponding to the profile of the threaded surface which has been scanned, and thus determine the desired dimensional variables of the threaded exterior surface, as well as perform the thread profile comparison step. The results may be displayed upon monitor 214 in true scale, or may be displayed in a highly magnified form, which is equivalent to a microscopic view of the pipe thread. The results of each determination of the desired dimensional variable may be electronically stored on a flexible computer disk or other magnetic media, or can be printed by printer 213, in a conventional manner. Additionally, the results, or data, may be transmitted via a conventional modem 220 to the office of a field engineer or drilling company employees.

When utilizing the method and apparatus of the present invention, the width W of the scanning light beam 152 may be varied between 0.5 to 8 inches; a width W approximately 2.00 inches being preferred, with a thickness of the scanning light beam of 0.003 inches or less. Accuracy of individual measurements made by the transmitters and receivers 157, 158 may be +/− 0.00002 inches over an average of two hundred measurements, which permits dimensional variables of the threaded exterior surface to be determined with a high degree of accuracy. Thread depth TD and lead L may be determined to an accuracy of 0.0005 inches (0.5 mil). The dimensional variables of taper T and the various diameters D may also be determined to an accuracy of 0.0005 inches (0.5 mil) and the dimensional variable of ovality may be determined to an accuracy of approximately 0.001 inches (1 mil). Each complete pass of the transmitters and receivers 157, 158, past the entire threaded exterior surface will typically take less than one minute to complete, and during such relative movement between the transmitter 157 and threaded surface 142 of pipe 140, the positioning table 170 will move from 1,000 to 5,000 steps per second, as previously discussed, and the measurements from receivers 158 will typically be recorded by the computer 211 at the rate of fifty times per second.

It is to be understood that the invention is not limited to the exact details of construction, operation, exact materials or embodiments shown and described, as obvious modifications and equivalents will be apparent to one skilled in the art. For example, the transmitters and receivers could be disposed to have the scanning beams lie in a plane which is perpendicular to the longitudinal axis of the table, rather than in a plane parallel with the longitudinal axis of the positioning table. Accordingly, the invention is therefore to be limited only by the scope of the appended claims.

I claim:

1. A non-contact method for measuring dimensional variables having strict tolerances of a threaded exterior surface of a length of pipe having a longitudinal axis, comprising the steps of:

directing at least one laser generated parallel scanning light beam, having a known width, in a plane which is substantially perpendicular to the longitudinal axis of the length of pipe to scan at least one portion of the threaded exterior surface;

providing relative sequential movement between at least one light beam and the threaded exterior surface in a direction along the longitudinal axis of the length of pipe;

receiving with a photo detector receiver at least one laser generated parallel scanning light beam at a plurality of sequential locations along the longitudinal axis of the length of pipe;

measuring the amount of the scanning beam width which is blocked by the threaded exterior surface at each sequential location; and storing the measured amounts as a function of the sequential locations to produce a profile of the threaded exterior surface and determining from the profile the desired dimensional variable of the threaded exterior surface.

2. The method of claim 1, including the step of comparing the profile of the threaded exterior surface with a known, desired profile, having acceptable tolerances, for the threaded exterior surface to determine if the threaded exterior surface, having its dimensional variables being measured, is within the acceptable tolerances of the known, desired profile.

3. The method of claim 1, wherein the length of pipe is maintained stationary, and sequentially moving the at least one light beam along the longitudinal axis of the length of pipe.

4. The method of claim 3, including the step of determining the dimensional variables of the threaded exterior surface of thread depth, lead, and taper.

5. The method of claim 4, including the step of graphically displaying the measured amounts which have been stored.

6. The method of claim 4, including the step of transmitting the measured amounts which have been stored to a distant location by use of a modem.

7. The method of claim 4, including the step of storing electronically the measured amounts which have been determined.

8. The method of claim 3, including the steps of: rotating the length of pipe about its longitudinal axis; and scanning an additional portion of the threaded exterior surface to determine a dimensional variable for the additional portion of the threaded exterior surface.

9. The method of claim 8, wherein the length of pipe is rotated three times, ninety degrees about the longitudinal axis of the length of pipe and scanning three additional portions of the threaded exterior surface to determine a dimensional variable for the three additional portions of the threaded exterior surface.

10. The method of claim 9, including the step of determining the dimensional variables of the threaded exterior surface of taper, ovality, and pitch diameter.

11. The method of claim 3, including the steps of: utilizing first and second laser generated parallel scanning light beams; disposing the first and second laser generated parallel scanning light beams in substantially diametrically opposed locations with respect to the length of pipe; and sequentially moving the first and second laser generated parallel scanning light beams to scan first and second portions of the threaded exterior surface, the first and second portions of the threaded exterior surface being substantially diametrically opposed from each other with respect to the length of pipe.

12. The method of claim 11, including the steps of: sequentially moving the first laser generated parallel scanning light beam in a first direction along the longitudinal axis of the length of pipe to scan the first portion of the threaded exterior surface; and then sequentially moving the second laser generated parallel scanning light beam in a second direction along the longitudinal axis of the length of pipe to scan the second portion of the threaded exterior surface; the first direction being opposite from the second direction with respect to the longitudinal axis of the length of pipe.

13. The method of claim 11, including the steps of: rotating the length of pipe ninety degrees about the longitudinal axis of the length of pipe; sequentially moving the first and second laser generated parallel scanning light beams to scan third and fourth portions of the threaded exterior surface, the third and fourth portions of the threaded exterior surface being substantially diametrically opposed from each other with respect to the length of pipe.

14. The method of claim 13, including the steps of: sequentially moving the first laser generated parallel scanning light beam in a first direction along the longitudinal axis of the length of pipe to scan the third portion of the threaded exterior surface; and then sequentially moving the second laser generated parallel scanning light beam in a second direction along the fourth portion of the threaded exterior surface, the first direction being opposed from the second direction with respect to the longitudinal axis of the length of pipe.

15. The method of claim 13, including the steps of: sequentially moving the first and second laser generated parallel scanning light beams simultaneously along the longitudinal axis of the length of pipe to simultaneously scan the first and second portions of the threaded exterior surface.

16. An apparatus for measuring dimensional variables having strict tolerances of a threaded exterior surface of a length of pipe having a longitudinal axis, comprising:
- at least one means for directing a laser generated parallel scanning light beam, having a known width, in a plane which is substantially perpendicular to the longitudinal axis of the length of pipe to scan at least one portion of the threaded exterior surface;
- means for providing relative sequential movement between the light beam directing means and the threaded exterior surface in a direction along the longitudinal axis of the length of pipe;
- at least one means for receiving the at least one light beam at a plurality of sequential locations along the longitudinal axis of the length of pipe and for measuring the amount of the scanning beam width which is blocked by the threaded exterior surface at each sequential location;
- means for storing the measured amounts as a function of the sequential locations to produce a profile of the threaded exterior surface and means for determining from the profile the desired dimensional variable of the threaded exterior surface; and
- means for mounting the at least one light beam directing means and the at least one receiving means in a spaced relationship with each other, with the portion of the threaded exterior surface of the length of pipe being disposed therebetween.

17. The apparatus of claim 16, wherein the mounting means is attached to the means for providing relative sequential movement, whereby the pipe is maintained stationary and the at least one light beam directing means and at least one receiving means are both simultaneously moveable in a direction along the longitudinal axis of the length of pipe.

18. The apparatus of claim 17, wherein the means for providing relative sequential movement is a positioning table driven by a linear motor drive.

19. The apparatus of claim 17, including two cooperating pairs of light beam directing means and receiving means associated with the mounting means, and disposed in a spaced relationship with each other with their scanning light beams disposed substantially parallel with each other, whereby diametrically opposed exterior threaded surfaces of a length of pipe are scanned upon movement of the mounting means.

20. The apparatus of claim 19, wherein the mounting means includes means for releasably adjusting the distance between the light beam directing means and receiving means of each pair, and for releasably adjusting the distance between the pairs of light beam directing means and receiving means, to permit different sizes of pipe to be scanned.

21. The apparatus of claim 20, wherein the means for releasable adjusting includes at least four elongate rod members adjustably disposed in a rectangular configuration, each light beam directing means and receiving means being fixedly secured to a plate member, each plate member being associated with at least one of the elongate rod members, whereby the plate members may be adjustably moved in a horizontal and vertical direction.

* * * * *